US006289740B1

(12) United States Patent
Posey, Jr. et al.

(10) Patent No.: US 6,289,740 B1
(45) Date of Patent: Sep. 18, 2001

(54) INTEGRATED FIBER OPTIC STRAIN SENSING USING LOW-COHERENCE WAVELENGTH-ENCODED ADDRESSING

(75) Inventors: Ralph Posey, Jr., Alexandria, VA (US); Alan D. Kersey, S. Glastonbury, CT (US); Michel J. LeBlanc, Centreville, VA (US); Michael A. Davis, Glastonbury, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/185,027

(22) Filed: Oct. 26, 1998

(51) Int. Cl.[7] ........................................ G01L 1/24
(52) U.S. Cl. .................. 73/800; 250/227; 356/345
(58) Field of Search ................... 73/653, 655, 657, 73/800; 250/227; 356/345

(56) References Cited

U.S. PATENT DOCUMENTS

| 4,634,852 | * | 1/1987 | Shaw .............................. 250/227.19 |
| 4,928,527 | * | 5/1990 | Burger et al. ......................... 73/657 |
| 5,392,117 | * | 2/1995 | Belleville et al. ................... 356/352 |
| 5,402,231 | * | 3/1995 | Udd ..................................... 356/350 |
| 5,682,237 | * | 10/1997 | Belk ................................... 356/345 |
| 5,706,079 | * | 1/1998 | Kersey ............................... 356/5.09 |

OTHER PUBLICATIONS

R. Posey et al., Low–Coherence, Wavelength–Encoded Addressing for Integrated Long–Gauge Length Fiber Optic Strain Sensing, Technical Digest for the Optical Society of America's 12th International Conference on Optical Fiber Sensors, Williamsburg, Va., Oct. 28–31, 1997.

* cited by examiner

Primary Examiner—Max Noori
(74) Attorney, Agent, or Firm—John J. Karasek; Sally A. Ferrett

(57) ABSTRACT

A system is disclosed for measuring strain using a technique of detecting the optical path difference in a sensing interferometer using an interrogating interferometer including a chirped fiber Bragg grating in which the optical path difference in the sensing interferometer is changed with the strain in the sensing arm, whereas the optical path difference of the interrogating interferometer is changed only by changing the center wavelength of addressing light, making use of the wavelength-dependency on the penetration depth inside the chirped fiber Bragg grating interferometer. Consequently, strain in the sensing interferometer can be assessed by determining the wavelength in which a coherence matched condition between the sensing and interrogation interferometers is attained.

6 Claims, 4 Drawing Sheets

INTEGRATED FIBER OPTIC STRAIN SENSING USING LOW-COHERENCE WAVELENGTH-ENCODED ADDRESSING

BACKGROUND OF THE INVENTION

1.0 Field of the Invention

The present invention relates to a system, and a method of operation thereof, for measuring strain to which a structure having predetermined dimensions is subjected and, more particularly, to a system, and a method of operation thereof, for measuring strain using a technique for detecting the optical path difference (OPD) between first and second arms respectively of a sensing interferometer using a reading interferometer that is capable of being interrogated by changing the wavelength of the addressing light so as to change its optical path length. The reading interferometer can also be used for a variety of other low-coherence applications, in which the "sensing interferometer" can be used to measure strain, temperature or even be non fiber-optic, such as the cornea of a human eye. In the case of the human cornea, the reading interferometer with the wavelength based interrogation approach, described in this invention, can be used to measure the shape of the lens.

2.0 Description of the Prior Art

Strain gauges that detect the strain that stress produces in a body or structure are known. Strain gauges may consist of one or more fiber optic cables mated to the surface of the structure under test. In such arrangements, as the surface becomes strained, the optic fiber cable stretches, undergoing a change in length that is proportional to the change in strain. One such strain gauge system may be a long gauge sensor system which is attractive because its sensors can measure the average strain over long structures and which find usage in structural monitoring and damage assessment related to the effects of strain. Long gauge sensors have been proposed using low coherent differential interferometry techniques to sense strain over several meters of optical fiber. Two such proposals are described in the following two technical articles, one of Fan, N. Y., S. Huang and R. M. Measures, entitled "Localized Long Gauge Fiber Optic Strain Sensors," published in *Smart Materials and Structures*, April, 1998, and the other of Inaudi, D., A. Elamari, L. Pflug, N. Gisin, J. Breguet, S. Vurpillot, entitled "Low-Coherence Deformation Sensors for the Monitoring of Civil-Engineering Structures," published in *Sensors and Actuators A*, 1994, 44, pp. 125–130, and both of which technical articles are herein incorporated by reference. A more general reference on low coherence techniques is: "Recent Program in Fiber Optic Low Coherence Interferometer" of Y. J. Rae and O. A. Jackson published in *Meas. Sci. Techn.* (1998) pp. 981–999, and herein incorporated by reference.

The primary sensors described in the first two technical articles above require the use of mechanical activation to modify the path length of the interrogating interferometer, either by stretching the optical fiber, as described in the technical article of N. Y. Fan et al, or by moving a mirror, as described in the technical article of D. Inaudi et al. The technical article of N. Y. Fan et al also reports a technique which eliminates the need for mechanical activation based on the use of a tuneable laser and a fixed Fabry-Perot cavity. Although the proposal of N. Y. Fan et al to eliminate the mechanical activation is worthwhile, it is further desired that a system, and a method of operation thereof, be provided that not only eliminates mechanical activation of a sensor, but also improves the speed of response for detecting and decoding the sensed strain.

OBJECTS OF THE INVENTION

It is a primary object of the present invention to provide for a system, and a method of operation, that measures the strain to which a structure is being subjected without the need of any mechanical activation of any sensors, while at the same time providing a relatively rapid speed of response thereof.

It is another object of the present invention to provide for a system that measures the sensed strain and does so without the need for analyzing any unnecessary portions of the detected signal.

It is a further object of the present invention to provide for a system, and a method of operation thereof, that uses the technique for balancing the optical path difference (OPD) of a sensing interferometer using an interrogating interferometer, the OPD of which can be changed by changing the center wavelength of the addressing light.

SUMMARY OF THE INVENTION

Broadly, the invention concerns an apparatus and method employing a pair of unbalanced interferometers, each of which is driven by a tunable light source. One interferometer, which acts as a reference (and is also called a balancing or interrogating interferometer), has in one arm a broadband reflector, preferably a chirped fiber Bragg grating. This sort of grating is one in which the spacing of the gratings changes progressively along the optical path through the grating. This causes the center wavelength at which the Bragg grating reflects to change correspondingly along the grating's optical path (penetration depth), and thus different wavelengths of light will reflect from different places in the grating. The other interferometer, called a "sensing" interferometer, has one arm (or both arms) fixed to a body subjected to strain so that the optical fiber constituting that arm distends along with the body. Light from the tunable source enters the sensing interferometer and then the reading interferometer. Each of the interferometers, taken individually, has an optical path difference larger than the coherence length of the tunable source and, consequently, would not cause interference fringes to be produced at the output of either interferometer. However, when the two interferometers are combined in series (stacked one after another), and are such that the OPD of the reading interferometer is equal to that of the sensing interferometer, interference fringes are produced. This coherence matching condition is obtained by the proper selection of the wavelength of the tunable source, assuming that the lengths of the arms of the reading interferometer are designed such that this matching condition is possible with the available tuning range, determined by the length of the Bragg grating. Consequently, a change in the OPD of the sensing interferometer (such as would be due to stress in the body to which it is attached) can be tracked by changing the wavelength of the tunable source so as to keep maximum fringe visibility, which corresponds to matched OPDs between the interferometers. Under such conditions, change in wavelength corresponds to change in strain in the sensing interferometer. Thus, strain is tracked by following the center wavelength of the source that produces maximum fringe visibility.

More specifically, the invention is primarily directed to a long gauge fiber sensor system for sensing strain.

The system measures strain to which a defined structure having predetermined dimensions is subjected and comprises first and second interferometers, a broadband optical source, a tuneable bandpass filter, detectors and means for coherence detection.

The first interferometer has a first optical path difference. The first interferometer has an input and an output at the beginning and end respectively of the first optical path difference. The first interferometer further comprises an optical fiber cable arranged with the defined structure so that the length of the optical fiber changes in correspondence with any changes in the predetermined dimensions of the defined structure due to the structure being subjected to strain. The changes in the length of the optical fiber directly corresponds to changes in the length of the first optical path difference.

The second interferometer has a second optical path difference which is capable of being interrogated by band-passed filtered light having a wavelength with the changes in the center wavelength of the bandpassed filtered light corresponding to changes in the length of the second optical path difference. The second interferometer has an input and an output at the beginning and end respectively of the second optical path difference. The second optical path difference being determined by the wavelength of the bandpassed filtered light.

The optical source is connected to a tuneable bandpass filter. The filter is tuneable in response to an applied control signal and provides an output light signal that is brought to the input of the first interferometer. Part of this output light is also fed to a first detector to serve as a normalization signal. Light at the output of the first interferometer is brought to the input of a second, reading, or interrogating interferometer. Light at the output of the reading interferometer is brought to a second detector. The signal of the second detector is divided (in a normalization circuit) by the signal of the first detector. The resulting signal thereof contains the coherence information. Means are provided to adjust the tuneable filter so as to maximize the coherence of the two interferometers, as determined by the presence of fringes in the signal. The control to the tuneable filter contains the wavelength information which relates to the strain seen by the reading interferometer. It should be noted that the same operation is obtained if light is first sent through the reading interferometer and then the sensing interferometer.

BRIEF DESCRIPTION OF THE DRAWINGS

These and other objects, features and advantages of the invention, as well as the invention itself, become better understood by reference to the following detailed description considered in conjunction with the accompanying drawings wherein like reference numbers designate identical or corresponding parts throughout and wherein.

DETAILED DESCRIPTION OF THE PREFERRED EMBODIMENTS

Figure 1:
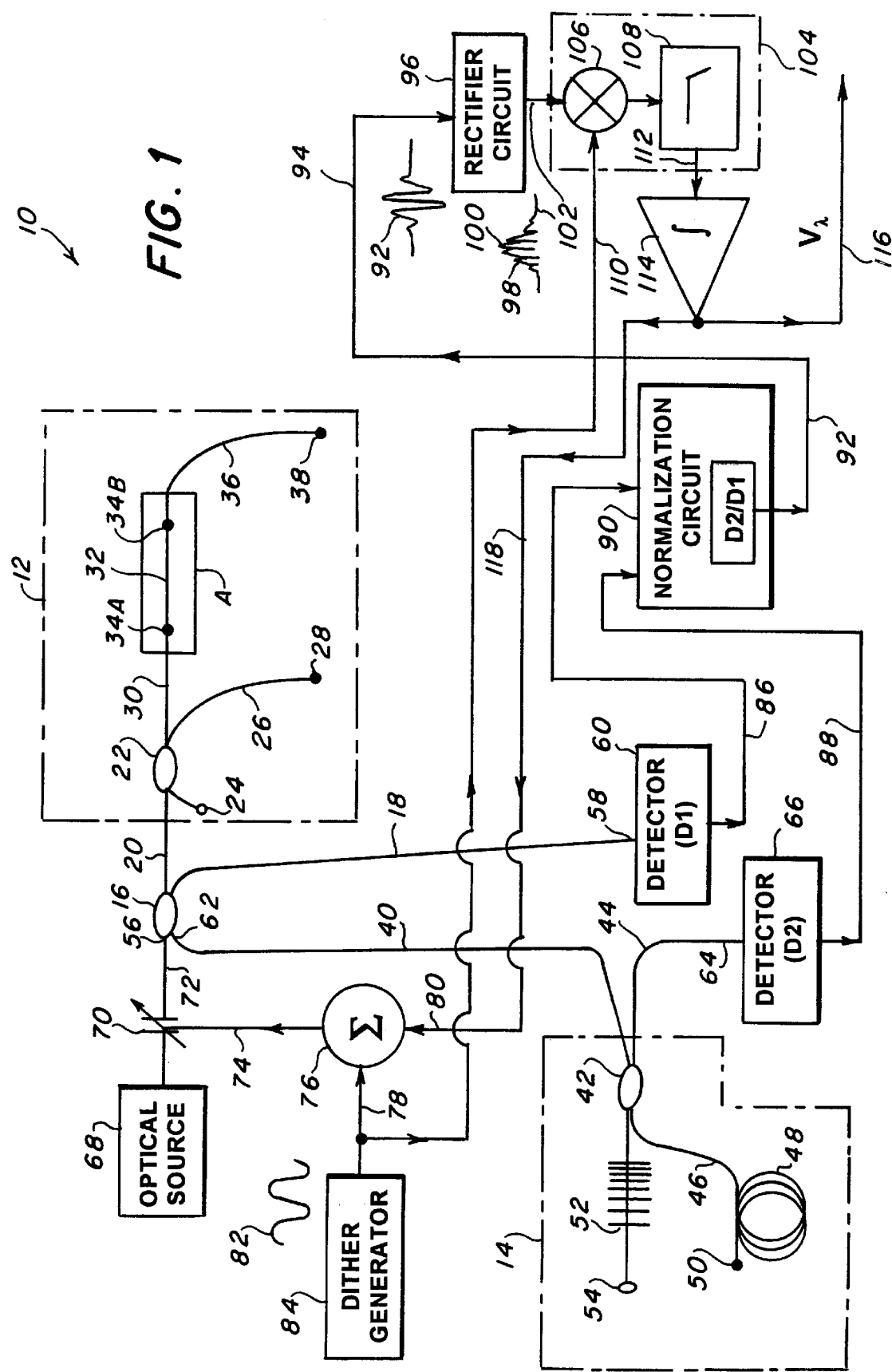
FIG. 1 is a block diagram of a system according to the present invention.

Referring to the drawings, there is shown in FIG. 1 a block diagram of a system 10 for measuring strain to which a body or structure having predetermined dimensions is subjected. The structure generally designated in FIG. 1 with the reference letter A may take any form so long as its dimensions are definable in a non-stressed state.

In general, the system 10 measures strain to which a structure A is being subjected by using a technique for detecting the optical path difference (OPD) of a sensing interferometer 12 using a reference or reading interferometer 14 that is capable of being interrogated by changing the wavelength of the addressing light. The interferometer 12 is interchangeably referred to herein as a first or sensing interferometer, whereas interferometer 14 is interchangeably referred to herein as a second, reference, reading or interrogating interferometer. Each of the sensing and reading interferometers 12 and 14, respectively, is arranged as an unbalanced Michelson interferometer known in the art, but if desired, the sensing interferometer 12 may be alternatively arranged as a Mach-Zehnder interferometer, also known in the art. Each of the interferometers 12 and 14 provides an interference pattern, also known in the art.

In general, the optical path difference (OPD) in the sensing interferometer 12 can be changed via straining the sensing arm, whereas the OPD of the reading or interrogating interferometer 14 can be changed via the center wavelength of the addressing light. Consequently, strain in the sensing interferometer 12 can be assessed by determining the wavelength at which a coherence matched condition between the two interferometers 12 and 14 is attained. The system 10 of the present invention provides a wavelength encoded form of operation and alleviates the need for a mechanically scanned mirror element in the interrogating interferometer suffered by some prior art devices.

The first interferometer 12 has a coupler 16 and a length of fiber optic cable 20 at its input stage, and comprises a coupler 22, an index matching element 24, a length of fiber optic cable 26, a first fiber mirror 28, a length of optical fiber (30, 32, 36) and a second fiber mirror 38. Optical fibers 30, 32 and 36 are one continuous fiber which can be mounted directly to a structure A, with portions 30 and 36 respectively mounted to structure A at attachment locations 34A and 34B. The lengths of the fiber optic cables 20, 26, 30 and 36 are fixed, whereas the fiber optic cable 32 is mated to the structure A whose strain is being measured and the length of fiber optic cable 32 is stretched in direct correspondence with the stress to which the structure A under test is being subjected. In another embodiment, all fiber lengths (26, 22, 30, 32, 36) of the first interferometer can be attached (glued) to the structure. In such a case, strain in the structure will result in a change in OPD in the first interferometer as long as the original length of the two arms of the first or sensing interferometer are not equal.

The second interferometer 14 has a length of fiber optic cable 40 at its input stage, and comprises a coupler 42, a length of fiber optic cable 46, a loop of fiber optic cable 48, a fiber optic mirror 50, preferably a chirped fiber Bragg grating (CFBG) 52, and an index matching element 54. The optical coupler 42 is connected to the fiber optic cable 40 and also to a fiber optic cable 44. If desired, the fiber optic mirror 50 may be replaced with a bulk mirror. The index matching elements 24 and 54 are selected, in a manner known in the art, to avoid unwanted reflections from their respective fiber ends. The length of the loop of the fiber optic cable 48 is selected so that the optical path difference (OPD), to be further described hereinafter, of the reading interferometer 14 matches the optical path difference (OPD) of the sensing interferometer 12, when structure A is in its un-strained condition. The chirped fiber Bragg grating 52 has a typical length of 22 mm and a typical bandwidth of about 10 nm full width at half maximum (FWHM). The center wavelength of the chirped grating is preferably chosen to match the center wavelength of the broadband source 68.

The couplers 16, 22 and 42 of the interferometers 12 and 14 are 50/50 couplers known in the art. Optical fiber length 32 of particular importance to the sensing interferometer 12, is arranged with the defined structure A so that the length of this fiber optic cable changes in correspondence with any changes in the predetermined dimensions of the structure A due to the structure A being subjected to stress. The changes in the length of the optical fiber 32 corresponds to changes in the length of the optical path difference of the sensing interferometer 12. The fiber optic cable 32 can have a typical length of 3.9 meters.

The first interferometer 12 has an optical path difference OPD1 which is a measurement of the round-trip time difference between a light pulse that travels from entry point which corresponds to the input of coupler 22 down to the fiber mirror 38, then back to the entry point 22, and a similar pulse that travels from entry point 22, to mirror 28 and then back to entry point 22. The difference in time between these pulses traveling to and returning from two different reflective mirrors 38 and 28 is OPD1. Similarly, the interferometer 14 has an optical path difference OPD2 which is a measurement of the total round-trip time difference between a light pulse that enters entry point which corresponds to the input of coupler 42, travels down to the mirror 50, and then back through the coupler 42 and a similar pulse that enters point 42, is reflected from a reflective device 52 (preferably a chirped fiber Bragg grating) and back to point 42.

The system 10 further comprises a tuneable optical source which preferably comprises the combination of a light source 68 and a tuneable narrow band filter 70. The light source 68 can be any broadband source whose output spectrum overlaps that of the Bragg grating, and, e.g., may be Erbium-doped fiber optical broadband light source, a broadband light emitting diode (LED) light source, an electroluminescent light emitting diode (ELED) broadband light source, and a superluminescent broadband light source. In one embodiment, the light source 68 may be a Lightwave Model MPS-8033 $Er^{+3}$ Fiber Optic Source.

The tuneable narrow band filter 70 may be selected from the group consisting of a fiber coupled Fabry-Perot interferometer, a cascaded Mach-Zehnder interferometer, an optical-optically tuned filter, a polarization band filter, and an in-fiber grating base filter. In one embodiment, the tuneable narrow band filter 70, interchangeably referred to herein as a band pass filter, may be an electronically tuneable Fabry-Perot (TFP) DMF300X-40 made available by Queensgate and having a bandwidth of 0.24 nm with an effective coherence length of approximately 4.3 mm. The coherence length ($l_c$) is a property of the filtered light and may be expressed by expression (1):

$$l_c = \frac{2\lambda^2}{\pi n \Delta \lambda_{FP}} \quad (1)$$

where $\lambda$ is the center frequency of the filtered light, n is the effective index of refraction of the optical fiber 72, and $\Delta \lambda_{FP}$ is the full width half maximum (FWHM) bandwidth of the filtered light.

The narrow band tuneable filter 70 provides an output light pulse applied to signal path 72 and is responsive to a control signal on signal path 74 generated by a summing network 76 having first and second inputs respectively on signal paths 78 and 80, and wherein the signal path 78 has applied thereto a dither signal 82 generated by a dither generator 84.

The detector (D2) 66 senses for the presence of any light signal, which is representative of the interference pattern generated by the combination of sensing interferometer 12 and reading interferometer 14 present at the exit section 42 of the reading interferometer 14 and generates an output signal thereof that is applied on signal path 88. Similarly, the detector 60 (D1) detects for the presence of a light signal, which is representative of the intensity of the light entering the input of interferometer 12, and upon detection thereof generates an output signal that is applied on signal path 86 which, along with signal path 88, is routed to a normalization circuit 90. The detectors 60 and 66 may each be a photodetector device or any other device that is responsive to impinging light rays.

The normalization circuit 90 receives the output of the first and second detectors 60 and 66, respectively, and divides the output signal of the second detector 66 by the output signal of the first detector 60 and provides an output signal 92 therefrom, shown in FIG. 1, that is applied to signal path 94. The signal path 94 is applied to a rectifier circuit 96. The normalization circuit 90 may be any type known in the art.

The rectifier circuit 96 receives output signal 92 of the normalizing circuit 90 and provides a rectified interference signal 98 having a peak 100. The signal 98 is sometimes referred to as an interference packet, fringe packet, or simply an interference signal. The interference signal 98 is applied to signal path 102 which, in turn, is routed to a lock-in amplifier 104 which serves as both mixer 106 and a low-pass filter 108, as shown in FIG. 1, with the low-pass filter-having a typical bandpass of 350 Hz.

The mixer 106 has first and second inputs and an output, with the first input having applied thereto the rectified interference signal 98 and the second input having applied thereto, by way of signal path 110, the dither signal 82. The output of the mixer 106 is routed to the low pass filter 108 which, in turn, generates a filtered output signal that is applied on signal path 112 and routed to an integrator 114. The integrator 114 has a time constant, such as 0.006 sec., that is selected so as to be large enough so that the integrator 114 does not respond to each individual fringe signal, such as that present at the side edges of signal 98, but rather integrates its received signal over the full signal 98, thereby treating signal 98 as having a single peak. The detection of a single peak is of importance to the present invention in a manner as to be further described hereinafter.

The integrator 114 provides an output signal $V_\lambda$ which is representative of the measured strain to which the structure A of FIG. 1 is subjected. The integrator 114 also provides the output signal $V_\lambda$ to signal path 118 which is routed to the second input of the summer 76 which, in turn, sums that input with its first input on signal path 78, that is, the dither signal 82 so as to produce the control signal on signal path 74 to which the narrow band tuned filter 70 is responsive.

Principle of Operation

Figure 2:
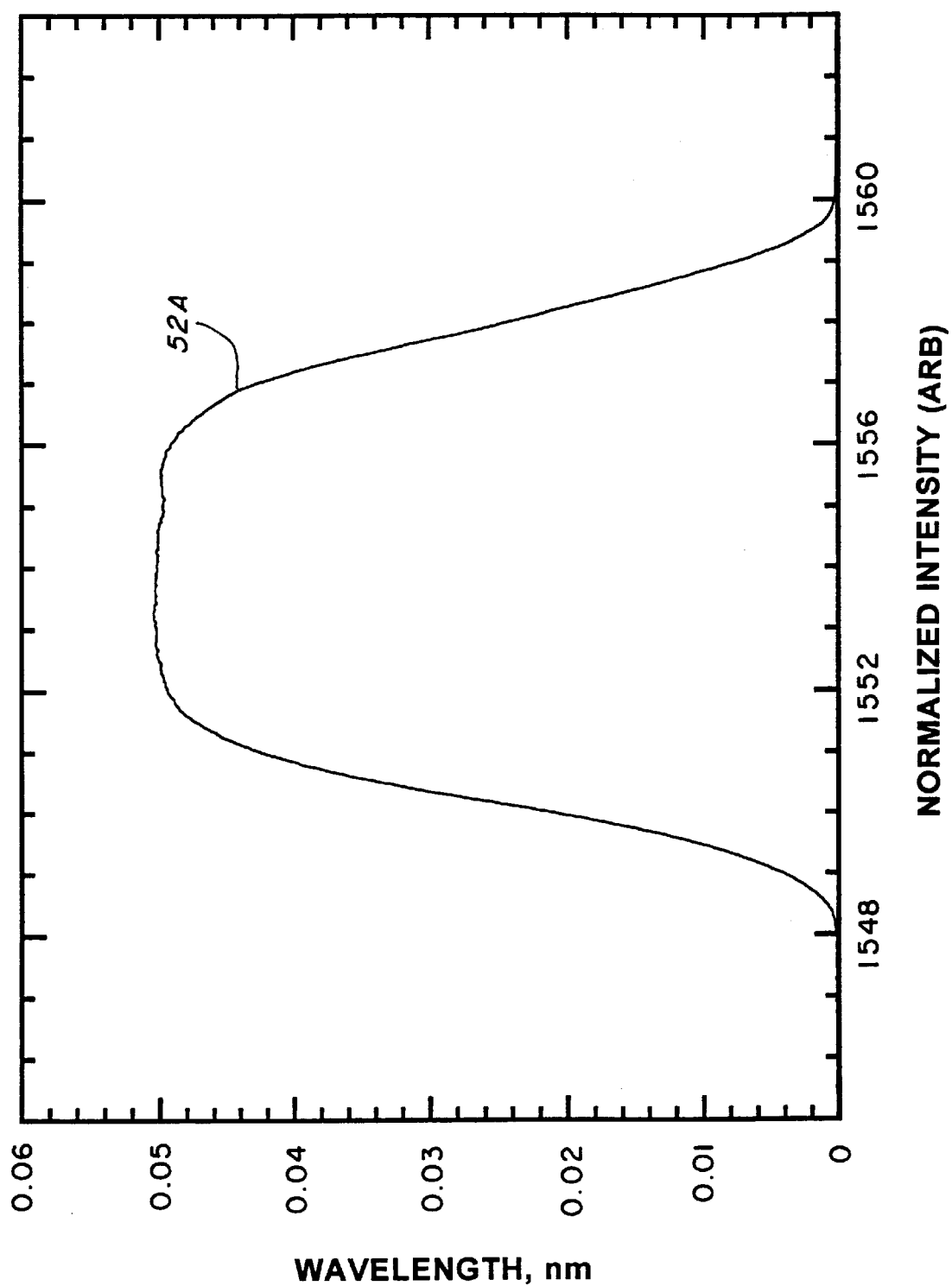
FIG. 2 is a profile of the chirped fiber Bragg grating used in the reading interferometer in the system of FIG. 1.

The system 10 is essentially a low-coherence interferometry-based, wavelength-encoded addressing scheme that senses the integrated optical fiber strain over several meters of fiber, that is, that system 10 senses the strain to which the optical cable 32 is subjected which, in turn, is a direct measurement of the strain to which the structure A of FIG. 1 is subjected. The interferometer 12 is a sensing interferometer which is preferably configured as a conventional Michelson device with fiber mirrors 28 and 38 at the fiber ends. The second interferometer 14 is preferably an interrogating interferometer which is implemented with a chirped fiber Bragg grating (CFBG) 52 in one arm of the interferometer 14. The chirped fiber Bragg grating (CFBG) 52 has a preferred profile 52A shown in FIG. 2.

The optical path difference (OPD1) in the sensing interferometer 12 is changed with strain in the sensing element, that is, with strain in structure A to which the sensing element is attached. Conversely, the optical path difference (OPD2) of the interrogating interferometer 14 is changed only by changing the wavelength of the addressing light, that is, the light generated by the combination of the broadband optical source 68 and the tuneable bandpass filter 70. Accordingly, the interrogating interferometer 14 makes use of the wave-dependence of the penetration depth, known in the art, inside the chirped fiber Bragg grating 52. Consequently, strain in the sensing interferometer 12 can be assessed by determining the wavelength at which a coherence matched condition is attained by the operation of the detectors 60 and 66, preferably the normalizing circuit 90, the rectifying circuit 96, the mixer 106, the low pass filter 108, the integrator 114, and the summer 76. The electronic and fiber optic arrangement of FIG. 1 provides a wavelength encoded form of operation and alleviates the need for mechanically scanned mirror elements in the interrogating interferometer 14 such as that suffered by some of the prior art strain gauges.

In operation, the Fabry-Perot filter 70 is selected so that the filtered light has a coherence length $l_c = 2\lambda^2/(\pi n \Delta \lambda_{FP})$, previously discussed with reference to expression (1). Each interferometers 12 and 14 is selected so its OPD>$l_c$ so that individually neither of interferometers 12 and 14 can produce interference fringes. It is the succession, that is, putting interferometers 12 and 14 in sequence that ensures the difference of the OPD's approaches zero. More particularly, the unbalanced interferometer 12 is selected to have an optical path difference OPD1 and the unbalanced interferometer 14 is selected to have an optical path difference OPD2 so that their difference $\delta = |OPD1-OPD2|$ can be made to be smaller than $l_c$, as given in expression (2):

$$\delta = |OPD1-OPD2| \rightarrow \delta < l_c$$

The two unbalanced Michelson interferometers comprise a sensing interferometer 12 which consists of two fiber mirrors 28 and 38, and a second interferometer 14 which is the reading, or interrogating interferometer 14 having a chirped fiber Bragg grating 52 on one of its arms and a length of fiber 48 coupled to the fiber optic mirror 50 on the other arm (which can alternately, be a bulk optic mirror). The length of fiber 48 is selected so as to match the optical path difference OPD2 of the reading interferometers 14 to that of the sensing interferometer 12.

The interference signal produced by the combination of the sensing and reading interferometer 12 and 14, respectively, present at exit section 42 of the interferometer 14 is detected by the detector 66 which is normalized by the reference signal detected by the detector 60 by the operation of the normalization circuit 90. This normalization compensates for non-uniform spectral profile of the light source. More particularly, detector 66 (D2) measures the intensity distribution of the coherence fringes of the system, whereas, detector 60 (D1) is used to remove, by dividing D2 by D1, the spectral profile of source 50 so that the output of the normalization circuit, that is, signal 92 (D2/D1) is independent of the source profile.

Figure 3A:
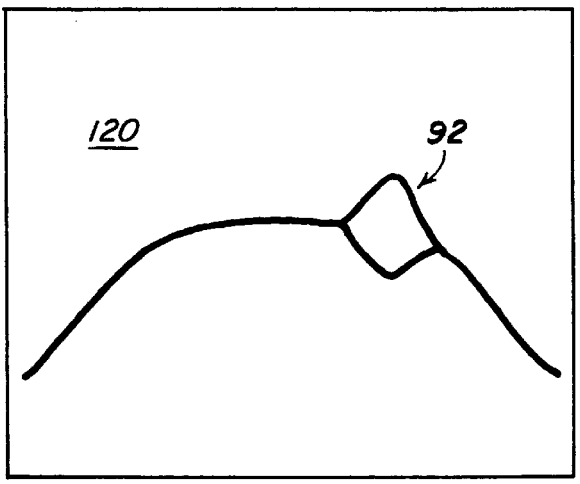
FIG. 3 illustrates the normalized profile of response of the system of FIG. 1 under three different states of strain in the sensing interferometer.
Figure 3B:
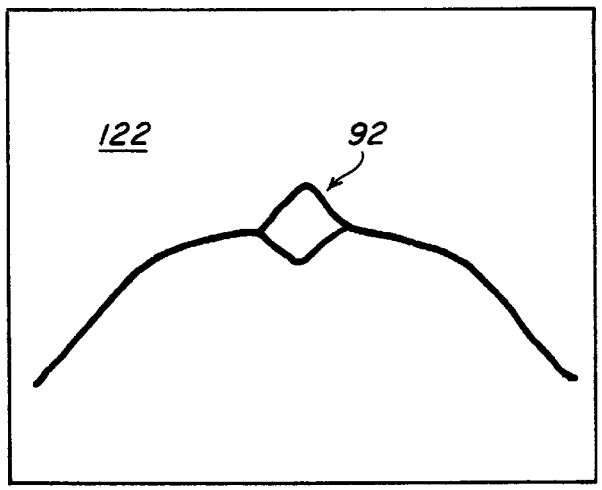
Figure 3C:
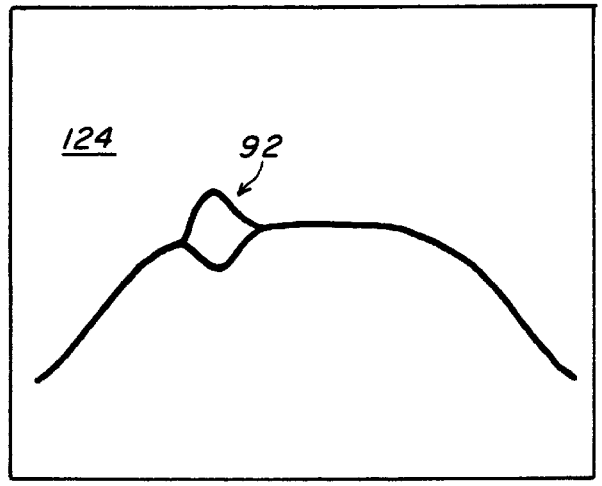

FIG. 3, composed of FIGS. 3(A), 3(B) and 3(C), shows the normalized profiles (D2/D1) as the Fabry-Perot tuneable filter 70 is scanned over the chirped fiber Bragg grating (CFBG) spectral bandwidth for applied strains on the sensing arm of approximately 0 microstrain (FIG. 3(A)—trace 120 having interference signal 92), 3000 microstrain (FIG. 3(B)—plot 122 having interference signal 92) and 6000 microstrain (FIG. 3(C)—plot 124 having interference signal 92) for a sensing element length (32), of 3.9 m.

Practice of the Present Invention

In the practice of the present invention devoid of the structure A of FIG. 1, a fiber was strained by moving a translation stage on which sensing fiber 32 was attached at 0.635 mm increments to stretch the sensing optical fiber. The position of the interference packet, that is the waveform 92 of FIG. 1, was detected using the circuit arrangement of FIG. 1, that is, the arrangement, sometimes referred to as an electronic peak tracking configuration, of the detectors 60 and 62, the normalizing circuit 90, the rectifying circuit 96, the lock-in amplifier 104, the integrator 114, and the summer 76.

In operation, the electronic peak tracking configuration first causes interference signal 92 to be AC coupled and rectified to form a packet 98 of positive-only fringes, having a peak portion 100. The time constant of the closed-loop of the electronic peak tracking configuration is essentially determined by the integrator 114 and is selected so as to be high enough so that the electronic peak tracking configuration does not respond to each individual fringe, but rather integrates over the full packet signal 98, thereby treating the signal 98 as having a single peak. The electronic peak tracking configuration locks-in at the center of the fringe packet 98, that is peak 100, and produces a tracking voltage $V_\lambda$ (signal paths 116 and 118) which is fed to the band pass tuneable filter 70 by way of signal path 74. The signal path 74 carries the control signal to hold the interrogation wavelength at that required to optimize the coherence signal produced by the interferometers 12 and 14 and detected by the detector 66, and normalized to the signal of detector 60. The tracking voltage present on signal path 116 is directly proportional to the central interrogation wavelength.

Figure 4:
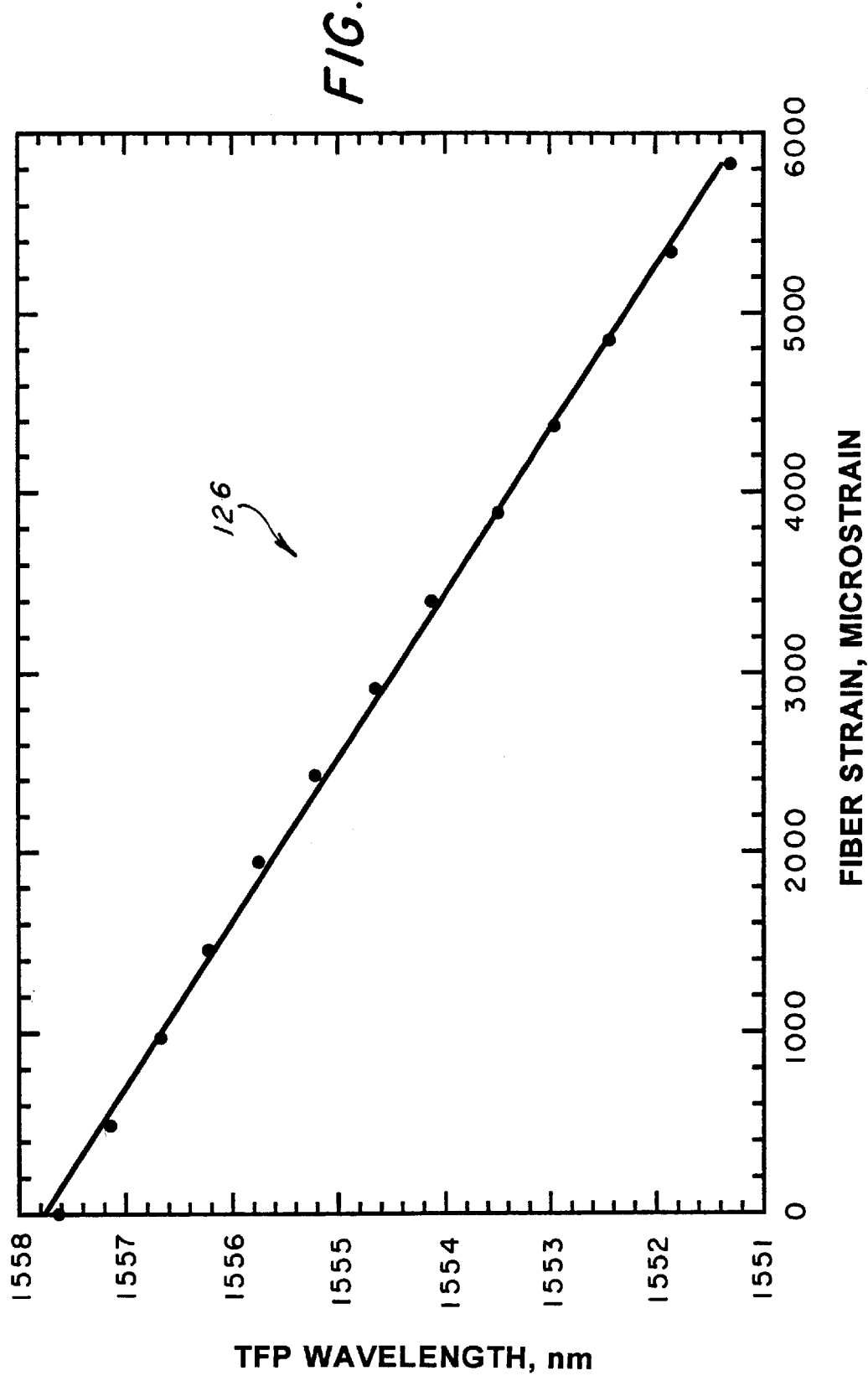
FIG. 4 illustrates the shift in coherence-matching condition due to increased fiber strain.

The results of the operation of the electronic peak tracking configuration of FIG. 1 is shown in FIG. 4 for the response 126. FIG. 4 shows the shift in the coherence-match condition with increased fiber strain. From the practice of the present invention a measurement resolution of approximately 50 microstrain was obtained.

It should now be appreciated that the practice of the present invention provides for a system for measuring the strain using a technique for detecting the optical path difference in a sensing interferometer 12 using a reading interferometer 14. The interrogation of the sensing interferometer 12 is done by tuning the electronically tuneable filter 70, such as the Fabry-Perot filter, as opposed to changing the physical length of the optical fiber in the reading interferometer 14. With the use of highly tuneable and stable tuneable filters, the present invention can operate in frequencies of 1 KHz and beyond, allowing the system to have a faster response than the mechanically lengthening strain system which works at tens of Hz at best. Further, the tuneable filter 70 may be tuned over a small wavelength range along the spectral bandwidth of the chirped fiber Bragg grating 52 to match the optical path differences between the interferometers 12 and 14 which, in turn, can correspond to large changes in the mesurand in the sensing fiber, that is, in the optic fiber cable 32.

The electronics of FIG. 1 is commonly known as a packet centroid lock-in approach and is used to determine the location of the interference packet, that is, signal 98 and permits the determination of the center wavelength, that is represented by peak 100, faster than digital centroid finding schemes that rely on data acquisition and analyzes of the complete interference packet. More particularly, this electronic packet centroid lock-in approach utilizes the principle of rectifying the interference packet 98 and locking onto the integrated peak 100 thereof.

The range of optical path difference that can be measured (and hence the range of strain in sensing element 32) by the present invention is determined by the length of the chirped fiber Bragg grating ($L_g$). The resolution of the measurements is determined by the width of the coherence packet which, in turn, is determined by the following two factors: (1) the coherence length of the source $l_c$ (given by equation 1) and (2) the effective width of the grating reflecting that light $\Delta z$. This effective width of the grating is given by:

$$\Delta z = \Delta \lambda_{FP}/C$$

where C is the ratio of the bandwidth of the grating $\Delta\lambda_g$ divided by its length $L_g$. This ratio C is also known as the degree of chirp of the grating. Because $\Delta z$ is proportional to $\Delta\lambda_{FP}$, whereas $l_c$ is inversely proportional to $\Delta\lambda_{FP}$, the narrowest width of the interferometer packet is obtained when $\Delta\lambda_{FP}$ is selected such that $l_c = \Delta z$. In that case, we have:

$$\Delta\lambda_{FP} = \lambda[2C/(\pi n)]^{1/2}$$

which results in:

$$l_c = \Delta z = \lambda[2/(\pi C n)]^{1/2}$$

Resolution is also affected by the accuracy with which the peak of the fringe packet can be determined relative to the width of the fringe packet. This is determined by the electronics used to track the peak. Since both the bandwidth of the Fabry-Perot filter and the characteristics of the Bragg grating can be selected as desired, it follows that resolution and dynamic range can be selected according to specific requirements for specific applications.

It is understood that the invention is not limited to the specific embodiments herein illustrated and described but may be otherwise without departing from the spirit and scope or the invention.

What we claim is:

1. A system for measuring distension to which a defined structure having predetermined dimensions is subjected and comprising;

(a) a first interferometer having an input and an output and a first optical path difference, said first interferometer having an input and an output at the beginning and end respectively of said first optical path difference, said first interferometer further comprising an optical fiber cable arranged with said defined structure so that the length of said optical fiber chances in correspondence with any changes in said predetermined dimensions of said structure due to said structure being subjected to change in dimension along the optical path length, said changes in said length of said optical fiber directly corresponding to chances in said first optical path difference;

(b) a second interferometer having an input and an output and a second optical path difference which is capable of being interrogated by tunable light having a center wavelength with the changes in the center wavelength of the band light correspondingly changing said length of said second optical oath difference, said second interferometer having an input and an output at the beginning and end respectively of said second optical path difference, said second optical path difference being determined by said wavelength of said light, said first interferometer and said second interferometer being disposed in series configuration, effective to produce an output from said configuration; and (c) an optical source tuneable in response to an applied control signal and providing an output light signal that is applied to the input of said first interferometer, and (d) said system further comprising a means for detecting the peak of the coherence in said output from said configuration, wherein said means for detecting comprises:

(a) first and second detectors respectively connected to said outputs of said tunable source and second interferometer, and each detector providing an output signal upon the respective detection of the presence of said light;

(b) a normalizing circuit receiving the output signals of said first and second detectors and dividing the output signal of the second detector by the output signal of the first detector and providing an output signal serving as interference signal therefrom;

(c) a rectifier circuit receiving the interference signal of the normalizing circuit and providing a rectified interference signal therefrom;

(d) a lock-in amplifier serving as a mixer and a low pass filter and having first and second inputs and an output, said first input having said rectified interference signal applied thereto and said second input having a dither signal generated by an external source and applied thereto;

(e) an integrator receiving said output of said lock-in amplifier and generating an output signal $V_\lambda$ serving as the output of said system and representative of measured strain to which said structure is subjected; and (f) a summer having first and second inputs and having an output which serves as said control signal, said first input having applied thereto said dither signal and said second input having applied thereto said output signal $V_\lambda$.

2. A method for measuring strain to which a defined structure having predetermined dimensions is subjected and comprising;

(a) providing a first interferometer having an input and an output and a first optical path difference, said first interferometer having an input and an output at the beginning and end respectively of said first optical path difference, said first interferometer further comprising an optical fiber cable arranged with said defined structure so that the length of said optical fiber changes in correspondence with any changes in said predetermined dimensions of said structure due to said structure being subjected to strain, said changes in said length of said optical fiber directly corresponding to changes in said first optical path difference;

(b) providing a second interferometer having an input and an output and a second optical path difference which is capable of being interrogated by light having a wavelength with the chances in said wavelength correspondingly changing said second optical path difference, said input of said second interferometer coupled to said output of said first interferometer, said second interferometer having an input and an output at the beginning and end respectively of said second optical path difference, said second optical oath difference being determined by said wavelength of said light;

(c) providing an optical source tuneable in response to an applied control signal and applying it to the input of said first interferometer;

(d) determining the degree of coherence between said first interferometer and said second interferometer; and wherein said second interferometer comprises a chirped fiber Bragg grating.

3. A method for measuring strain to which a defined structure having predetermined dimensions is subjected and comprising;

(a) providing a first interferometer having an input and an output and a first optical path difference, said first interferometer having an input and an output at the beginning and end respectively of said first optical path difference, said first interferometer further comprising an optical fiber cable arranged with said defined structure so that the length of said optical fiber changes in correspondence with any changes in said predetermined dimensions of said structure due to said structure being subjected to strain, said chances in said length of said optical fiber directly corresponding to changes in said first optical path difference;

(b) providing a second interferometer having an input and an output and a second optical path difference which is capable of being interrogated by light having a wavelength with the chances in said wavelength correspondingly changing said second optical path difference, said input of said second interferometer coupled to said output of said first interferometer, said second interferometer having an input and an output at the beginning and end respectively of said second optical oath difference, said second optical oath difference being determined by said wavelength of said light;

(c) providing an optical source tuneable in response to an applied control signal and applying it to the input of said first interferometer;

(d) determining the degree of coherence between said first interferometer and said second interferometer; and wherein said step of providing said means for detecting the coherence signal in said output signal comprises:

(a) dividing the output signal of the second detector by the output signal of the first detector and providing a normalized interference signal therefrom;

(b) receiving and rectifying the interference signal of the normalizing circuit and providing a rectified interference signal therefrom;

(c) receiving and mixing the rectified interference signal with a dither signal and providing a resulting signal therefrom;

(d) filtering the resulting signal;

(e) receiving and integrating said filtered resulting signal and generating an output signal $V_\lambda$ serving as an output representative of measured strain to which said structure is subjected; and (f) summing the output signal $V_\lambda$ with a dither signal to generate said control signal.

4. The method according to claim 3, wherein said rectified signal has a peak and wherein said output signal $V_\lambda$ corresponds to wavelength of maximum coherence and wherein said method further comprises;

tracking output signal $V_\lambda$ which is representative of said measured strain to which said structure is subjected.

5. The method of claim 2, wherein said determining comprises:

providing first and second detectors respectively connected to said outputs of said tuneable source and second interferometers and each detector providing an output signal upon respective detection of the presence of said light: and providing means connected to each of the output signals of said first and second detectors for detecting and normalizing a coherence signal and generating an output signal serving as said control signal and representative of the strain to which said structure is being subjected.

6. The method according to claim 2, wherein said light is first applied to said first interferometer and with said second interferometer connected to the output of said first interferometer.

* * * * *